United States Patent Office 3,743,497
Patented July 3, 1973

3,743,497
N-POLYHALOVINYLTHIO UREAS AS AQUATIC HERBICIDES
Melancthon S. Brown, Berkeley, Calif., assignor to Chevron Research Company, San Francisco, Calif.
No Drawing. Original application Jan. 7, 1969, Ser. No. 789,596, now Patent No. 3,652,630. Divided and this application June 28, 1971, Ser. No. 163,523.
Int. Cl. A01n 9/12
U.S. Cl. 71—66     4 Claims

ABSTRACT OF THE DISCLOSURE

Ureas of the formula

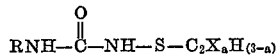

in which R is hydrogen, hydrocarbyl radicals of 1 to 15 carbon atoms which are free of aliphatic unsaturation and have 0 to 3 halogen substituents, X is Cl or Br and $a$ is 2 or 3. These ureas are biologically active against fungi and aquatic weeds.

FIELD OF INVENTION

This invention is directed to novel N-polyhalovinylthio ureas and their biological uses.

CROSS REFERENCE TO RELATED APPLICATION

This application is a division of application Ser. No. 789,596, filed Jan. 7, 1969, now U.S. Pat. 3,652,630.

INVENTION DESCRIPTION

The N-polyhalovinylthio ureas of this invention may be represented by the chemical formula

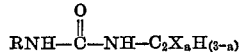

wherein R is hydrogen, a hydrocarbyl radical of 1 to 15 carbon atoms which is free of aliphatic unsaturation and has 0 to 3 halogen substituents of atomic number 17 to 35, X is halogen of atomic number 17 to 35 and $a$ is 2 or 3. Halogens of atomic numbers 17 to 35 are Cl and Br. Usually R will be of 1 to 8 carbon atoms. Preferably X is Cl, $a$ is 3 and R is an alkyl radical of 1 to 4 carbon atoms or a monocyclic aryl radical of 6 to 8 carbon atoms having 0 to 2 nuclear chloro substituents.

Representative polyhalovinyl groups which —$C_2X_aH_{3-a}$ may represent are trichlorovinyl, 1,2-dichlorovinyl, 2,2-dichlorovinyl, tribromovinyl, 2,2 - dibromovinyl, 1,2 - dibromovinyl and 2-bromo-2-chlorovinyl.

Hydrocarbyl radicals which R may represent include alkyl, cycloalkyl and aryl radicals. Typical alkyl radicals are exemplified by methyl, ethyl, propyl, t-butyl, hexyl, heptyl, nonyl, decyl, tridecyl and pentadecyl. Halo-substituted alkyl radicals are illustrated by chloromethyl, bromomethyl, 2,2-dichloropropyl, 3-bromopropyl, 2,2,3-trichlorobutyl, 6-chlorohexyl and 8,9-dichloropentadecyl. Cycloalkyl radicals include cyclopropyl, cyclobutyl, cyclohexyl, p-methylcyclohexyl and cyclooctyl. Halo-substituted cycoalkyl radicals are 4-chlorocyclohexyl, 2,4,6-trichlorocyclohexyl, 2-bromocyclopropyl, 3,5-dibromocyclohexyl and 4-bromocyclooctyl.

The aryl radicals represented by R may be monocyclic or polycyclic such as naphthyl. Usually they will be monocyclic, aralkyl or monocyclic alkaryl. Such aryl radicals are phenyl, tolyl, xylyl, cumyl, benzyl, 2-phenylethyl and the like. Halo-substituted aryl radicals which R may include are p-chlorophenyl, p-bromophenyl, 2,6-dibromophenyl, 2,4,6 - trichlorophenyl and 2 - chloro-4-methylphenyl.

The following compounds illustrate chemicals coming within the above formula:

N-methyl-N'-tribromovinylthio urea,
N-bromomethyl-N'-trichlorovinylthio urea,
N-ethyl-N'-2,2-dichlorovinylthio urea,
N-t-butyl-N'-2-bromo-2-chlorovinylthio urea,
N-2,3,4-trichlorobutyl-N'-2,2-dichlorovinylthio urea,
N-cyclopropyl-N'-2,2-dichlorovinylthio urea,
N-3,5-dibromocyclohexyl-N'-trichlorovinylthio urea,
N-p-methylcyclohexyl-N'-trichlorovinylthio urea,
N-2,4,6-trichlorocyclohexyl-N'-trichlorovinylthio urea,
N-cyclobutyl-N'-tribromovinylthio urea,
N-2-phenylethyl-N'-trichlorovinylthio urea,
N-tribromovinylthio urea,
N-2,2-dichlorovinylthio urea,
N-p-xylyl-N'-trichlorovinylthio urea,
N-2,4-dibromophenyl-N'-2,2-dibromovinylthio urea,
N-o-chlorophenyl-N'-trichlorovinylthio urea,
N-p-bromophenyl-N'-trichlorovinylthio urea,
N-2,4,6-tribromophenyl-N'-tribromovinylthio urea,
N-p-tolyl-N'-trichlorovinylthio urea,
N-p-cumyl-N'-2,2-dichlorovinylthio urea,
N-3,5-dichlorophenyl-N'-trichlorovinylthio urea,
N-2,4,6-trichlorophenyl-N'-trichlorovinylthio urea and
N-2-chloro-4-tolyl-N'-trichlorovinylthio urea.

The ureas of this invention may be prepared by reacting a sulfenyl halide with a suitable urea. This reaction is illustrated by the following chemical equation:

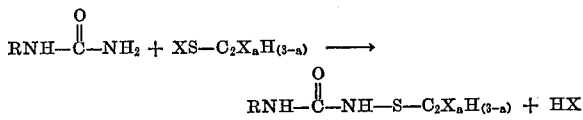

wherein R, X and $a$ are as defined previously. Sulfenyl halide reactants which may be used in this reaction are disclosed in U.S. Pat. Nos. 3,296,302 and 3,155,720.

It is desirable to carry this reaction out in the presence of inert solvents such as dimethyl sulfoxide, dimethylformamide, acetonitrile, dioxane and the like. The reaction temperature is in general not critical and will usually be in the range of −20 to about 50° C., preferably about 0 to 20° C. Likewise, the pressure is not critical and will usually be atmospheric or autogenous. It is desirable to use stoichiometric proportions of the reactants or a slight excess of the sulfenyl halide reactant.

Ureas of this invention may also be prepared by the dehydrohalogenating corresponding N-polyhaloalkylthio ureas. For instance, N-tetrachloroethylthio ureas may be dehydrohalogenated to produce N-trichlorovinylthio ureas. This dehydrohalogenation will normally be carried out at low temperatures, usually about 0 to 40° C. in the presence of solvents such as benzene, toluene, ether, methylene chloride, acetonitrile and chloroform. Mild dehydrogenating agents such as tertiary amines (trialkyl amines, pyridine, etc.) or alkali metal carbonates may be used. Triethylamine is a preferred dehydrohalogenating agent in this reaction.

EXAMPLES

Example 1

To a solution of 50 g. of N-1,1,2,2,-tetrachloroethylthio urea in 250 ml. of acetonitrile cooled in an ice bath was added slowly with stirring 22 g. of triethylamine. The reaction mixture was kept three hours in the ice bath and then filtered to remove triethylamine hydrochloride. The solvent was removed and the residue dissolved in 300 ml. of chloroform. This solution was washed with two 150 ml. portions of water, dried over magnesium sulfate and concentrated. The solid product was isolated by filtration and recrystallized from chloroform to give 13 g. of N-trichlorovinylthio urea. The melting point of this compound was about 120–125° C. Element analysis was: Calculated (percent): S, 14.5; Cl, 48.2. Found (percent) S, 14.32; Cl, 48.2.

Example 2

To a solution of 35 g. of phenyl urea in 200 ml. of dimethylformamide cooled in an ice bath was added slowly with stirring 50 g. of trichlorovinyl sulfenyl chloride. After addition the mixture was stirred at room temperature for 1 hour and then added to 1 liter of ice water plus 200 ml. of hexane. The solid was isolated by filtration and washed with 100 ml. of water, 100 ml. of hexane and 50 ml. of cold acetonitrile and dried under vacuum over phosphorus pentoxide to give 59 g. of crude N-phenyl-N'-trichlorovinylthio urea. This product was re-crystallized from 500 ml. of ethanol to give 40 g. of purified material. The melting point of this compound is about 160–162° C. Elemental analysis was: Calculated (percent): S, 10.72; Cl, 35.6. Found (percent) S, 10.82; Cl, 35.75.

Example 3

To a solution of 15 g. of N-1,1,2,2-tetrachloroethylthio-N'-methyl urea in 100 ml. of acetonitrile cooled in an ice bath was added slowly with stirring 6 g. of triethylamine in 10 ml. of acetonitrile. The reaction mixture was kept for 2 hours in the ice bath and then filtered. The solid obtained was slurried with 200 ml. of water, filtered and washed with 50 ml. of water to remove any triethylamine hydrochloride. The solid was dried under vacuum over phosphorus pentoxide to give 7.2 g. of N-methyl-N'-trichlorovinylthio urea. The melting point of this compound was about 139–140° C. Element analysis was: Calculated (percent): S, 13.55; Cl, 45.1. Found (percent): S, 13.82; Cl, 43.9.

Other ureas of this invention were prepared by the methods described above. These ureas are listed in Table I.

TABLE I

| Urea | M.P. (° C.) | S Theor. | S Found | Cl Theor. | Cl Found |
|---|---|---|---|---|---|
| N-ethyl-N'-trichlorovinylthio urea | 136–139 | 12.82 | 12.62 | 42.6 | 41.5 |
| N-t-butyl-N'-trichlorovinylthio urea | 119–122 | 11.52 | 11.35 | 38.4 | 38.65 |
| N-benzyl-N'-trichlorovinylthio urea | 148–150 | 10.29 | 10.32 | 34.20 | 33.70 |
| N-isopropyl-N'-trichlorovinylthio urea | 127–130 | 12.1 | 12.01 | 40.2 | 30.2 |
| N-p-chlorophenyl-N'-trichlorovinylthio urea | 158–160 | 9.62 | 9.93 | 42.7 | 44.18 |
| N-n-butyl-N'-trichlorovinylthio urea | 100–103 | 111.55 | 11.05 | 38.4 | 38.6 |
| N-cyclohexyl-N'-trichlorovinylthio urea | 125–130 | 10.50 | 10.55 | 34.9 | 35.10 |

UTILITY

The N-polyhalovinylthio ureas of this invention exhibit biological activity against a variety of organisms, such as fungi, algae and aquatic weeds.

Their activity against aquatic weeds was illustrated by testing representative ureas of this invention by the following method.

An acetone solution of equal parts of N-trichlorovinylthio urea and surfactant (alkylarylpolyoxethylene glycol and fatty acid) was prepared. This solution was mixed with a nutrient broth in a quantity sufficient to give a concentration of 2 p.p.m. of urea. 4 replicate 150 ml. specimen cups were filled with this mixture. A 2 inch stem section of Elodea, 315–400 mg. Nitella and about 20 fronds of Lemna were place in each specimen cup. The cups were then placed in an environment chamber for incubation. The effect of the urea on each organism was observed and recorded after 10 days. The results of these tests reported as the average of the 4 replicates on a 0 to 100 basis—0 indicating no effectiveness; 100 indicating complete effectiveness—appear in Table II below.

TABLE II

| | Percent control | | |
|---|---|---|---|
| | Nitella | Lemna | Elodea |
| N-methyl-N'-trichlorovinylthio urea | 100 | 100 | 93.8 |
| N-trichlorovinylthio urea | 95 | 57.5 | 95 |
| N-benzyl-N'-trichlorovinylthio urea | 100 | 97.5 | 75 |
| N-phenyl-N'-trichlorovinylthio urea | 91.3 | 45 | 75 |
| N-p-chlorophenyl-N'-trichlorovinylthio urea | 100 | 67.5 | |

As illustrated above ureas of this invention may be used to control the growth of and/or eradicate aquatic weeds. Such control may be effected in aqueous industrial cooling streams and effluents, lakes, streams, canals and pools. When so used a biocidal quantity of one or more of the areas of this invention is added to the aqueous growth environment of the organism. The dosage will usually be between about 0.1 and 50 p.p.m.—which is equivalent to about 0.3 to 135 lbs. per acre-foot of water. More usually the dose will be on the range of 1 to 10 p.p.m. or about 2.7 to 27 lbs. per acre-foot of water. These ureas may be applied to aqueous bodies at such dosages in the form of water-dispersible powders or in solution with water-miscible solvents.

Ureas of this invention was also used to control fungi such as *Monilinia fructicola, Alternaria solani, Rhizoctonia solani, Pythium ultimum* and *Helminthosporium satium*. When used as fungicides one or more of the ureas of this invention will be formulated and applied in fungicidal amounts—usually at dosages between 0.5 to 250 p.p.m.—by conventional art methods to fungi or hosts which are subject to fungus attack, especially vegetative hosts such as plants, plant seeds, paper and the like. They may be formulated with inert liquid diluents or solid carriers as powders, solutions or dispersions for such use.

Pesticidal formulations of the ureas of this invention may also contain surfactants, sticking agents, fillers, other compatible pesticides and the like.

I claim:

1. Method for controlling aquatic plants in an aqueous body which comprises adding a biocidal amount of the compound of the following formula

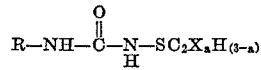

wherein R is hydrogen, lower alkyl or phenyl, substituted with 0 to 3 chlorine or bromine atoms, X is chlorine or bromine and $a$ is 2 or 3 to said body.

2. The method of claim 1 wherein X is chlorine and $a$ is 3.

3. The method of claim 2 wherein R is alkyl of 1 to 4 carbon atoms or phenyl having 0 to 2 chloro substituents.

4. The method of claim 1 wherein $a$ is 3, X is chlorine and R is hydrogen, methyl, ethyl, t-butyl, phenyl, isopropyl p-chlorophenyl or n-butyl.

References Cited

UNITED STATES PATENTS

| | | | |
|---|---|---|---|
| 3,154,468 | 10/1964 | Aichenegg et al. | 424—274 |
| 3,178,447 | 4/1965 | Kohn | 260—453 R |
| 3,234,275 | 2/1966 | Malz et al. | 260—453 R |
| 3,276,855 | 10/1966 | Richter | 260—453 R |
| 3,344,153 | 9/1967 | Kühle et al. | 260—453 R |
| 3,366,643 | 1/1968 | Weil et al. | 424—274 |
| 3,489,766 | 1/1970 | Weil et al. | 424—274 |
| 3,496,208 | 2/1970 | Bachman et al. | 260—453 R |
| 3,502,705 | 3/1970 | Brown | 260—453 R |
| 3,652,630 | 3/1972 | Brown | 71—66 |

LEWIS GOTTS, Primary Examiner

G. HOLLRAH, Assistant Examiner